United States Patent [19]

Honnold

[11] 4,042,044
[45] Aug. 16, 1977

[54] REAR FOLDING IMPLEMENT

[75] Inventor: Darrel Lee Honnold, Winterset, Iowa

[73] Assignee: Deere & Company, Moline, Ill.

[21] Appl. No.: 675,813

[22] Filed: Apr. 12, 1976

[51] Int. Cl.² ........................................ A01B 65/02
[52] U.S. Cl. .............................. 172/311; 172/456; 280/411 A
[58] Field of Search ............... 172/311, 456, 457, 481, 172/581, 662, 674, 626, 776; 280/411 R, 411 A, 413, 476 A

[56] References Cited

U.S. PATENT DOCUMENTS

| | | | |
|---|---|---|---|
| 2,944,615 | 7/1960 | Clark | 172/456 |
| 2,973,818 | 3/1961 | Marvin | 172/456 |
| 3,428,333 | 2/1969 | Nelson | 280/411 A |
| 3,548,954 | 12/1970 | Lindemann | 172/311 |
| 3,606,848 | 12/1968 | Dobbs | 111/7 |
| 3,700,040 | 10/1972 | Sosalla | 172/311 |
| 3,935,696 | 2/1976 | Pavel | 56/385 |
| 3,944,001 | 3/1976 | Warner | 172/311 |
| 3,960,221 | 6/1976 | Blair | 172/456 |
| 3,982,773 | 9/1976 | Stufflebeam | 172/456 X |

Primary Examiner—Richard J. Johnson

[57] ABSTRACT

A rearwardly folding multi-sectional agricultural implement includes power rotated toolbars elevated during transport to eliminate tool interferences at sectional hinge joints. The outboard sections are mechanically moved between operative and transport positions, mechanically secured in each position and resiliently restrained against lateral movement when in the transport position.

25 Claims, 8 Drawing Figures

REAR FOLDING IMPLEMENT

BACKGROUND OF THE INVENTION

The present invention relates generally to agricultural implements and more particularly to implements capable of being folded rearwardly for transport purposes.

Modern drawn and integral implements are becoming wider and heavier as efforts continue toward increasing farmer productivity and profitability. As implements increase in size, transport and storage become more difficult. Various means have been devised to reduce the size of implements for transport including rearwardly, forwardly and upwardly folding frames.

When implement frames are folded rearwardly or forwardly, it is necessary to prevent the tools mounted at the ends of the adjacent sections from interferring with one another. Consequently, many existing rear and forward fold implements utilize means to elevate the tool supporting toolbars on all sections prior to folding. As a result duplicate sets pf hydraulics and rotating linkages are required. Additionally, implements in which such working tools are thus elevated for transport must be structurally strengthened to withstand the stresses and loadings created by such elevations. As a result manufacturing and maintenance expenses often increase.

Existing rearwardly folding implement frames are often folded as the operator slowly advances the implement after first having manually released a brace or pin holding the outboard sections rigid with the central section. After folding the outboard sections the operator must leave his tractor and latch the sections together in order to stabilize the implement during transport. Further, the sections rigidly joined by such bars and rigid devices track poorly often skidding or swinging as corners are maneuvered during transport.

Upwardly folding implement frames also present tool interferences between those tools mounted on adjacent section ends. However, upwardly folding sections if too wide, will extend too high when folded, and preclude the operator from transporting them beneath rural power lines and other low hanging obstacles. Thus, such toolbars are quite limited with respect to a practical maximum width.

SUMMARY OF THE INVENTION

The principal object of the present invention is to provide a rear folding agricultural implement which eliminates interferences between tools on adjacent section ends and can be simply and automatically folded between the operational and transport configurations.

It is further an object to provide a single powered latching mechanism for securing these outboard sections in either the operational or transport configuration.

Another object is to provide means for limiting the lateral movement of the trailing outboard sections during transport and thereby improve tracking while at the same time minimizing the skidding of the trailing sections during turning maneuvers.

A more general object is to provide a rearwardly folding implement which can be automatically folded, latched in the folded configuration for transport and then unlatched and unfolded back into the operational configuration and latched without requiring the operator to leave his tractor cab.

Another object is to provide a foldable implement frame adaptable to either drawn or integral usage and one which can be utilized for whatever row width as might be desired.

A more specific object of the present invention is to provide a latch mechanism which secures the folding linkage in either its operative or transport position to lock the outboard section in position.

Additionally, it is another object to provide a linkage universally connected with the outboard section to compensate for vertical and lateral movement of the sections during transport operations.

Accordingly, applicant has provided a rearwardly folding implement in which interferences between tools on adjacent sections are eliminated as outboard sections are automatically folded and latched in transport position. Tracking during transport is improved as trailing sections are capable of limited lateral movement.

DESCRIPTION OF THE PREFERRED EMBODIMENT

Figure 1:
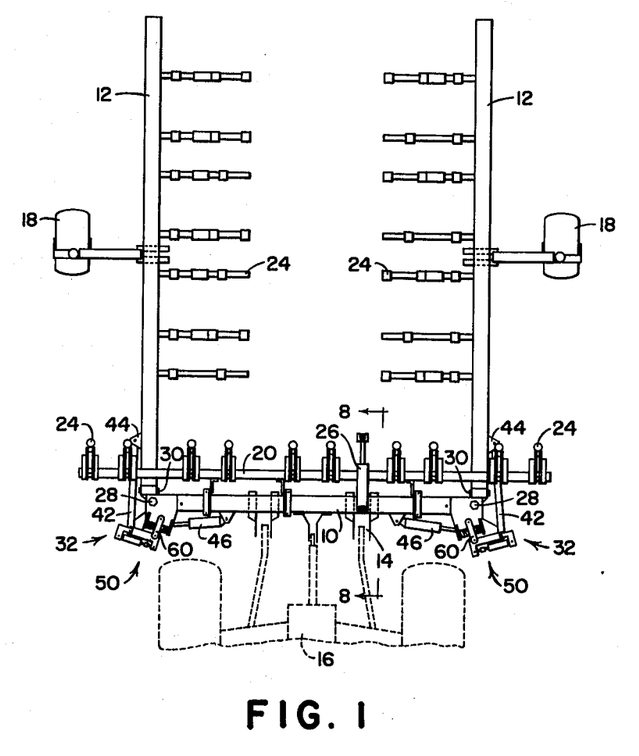
FIG. 1 is a plan view of the foldable implement illustrating the sections in the transport configuration.

Referring now to the drawings and particularly FIG. 1, there is illustrated an implement frame having a central beam or section 10 and two rearwardly folded outboard sections or beams 12. Attached to the central section 10 is a hitch means 14 for releasably coupling the implement frame with a tractor 16. Supporting each outboard section 12 for travel over the ground are ground-engaging caster wheels 18.

Figure 2:
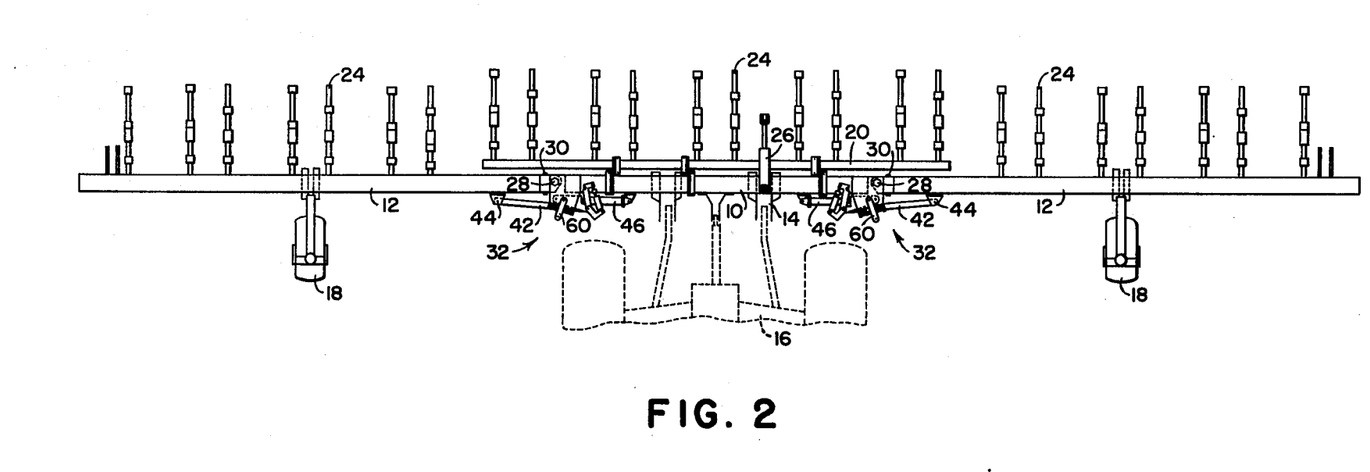
FIG. 2 is a plan view of the foldable implement illustrating the sections in their operational configuration.
Figure 8:
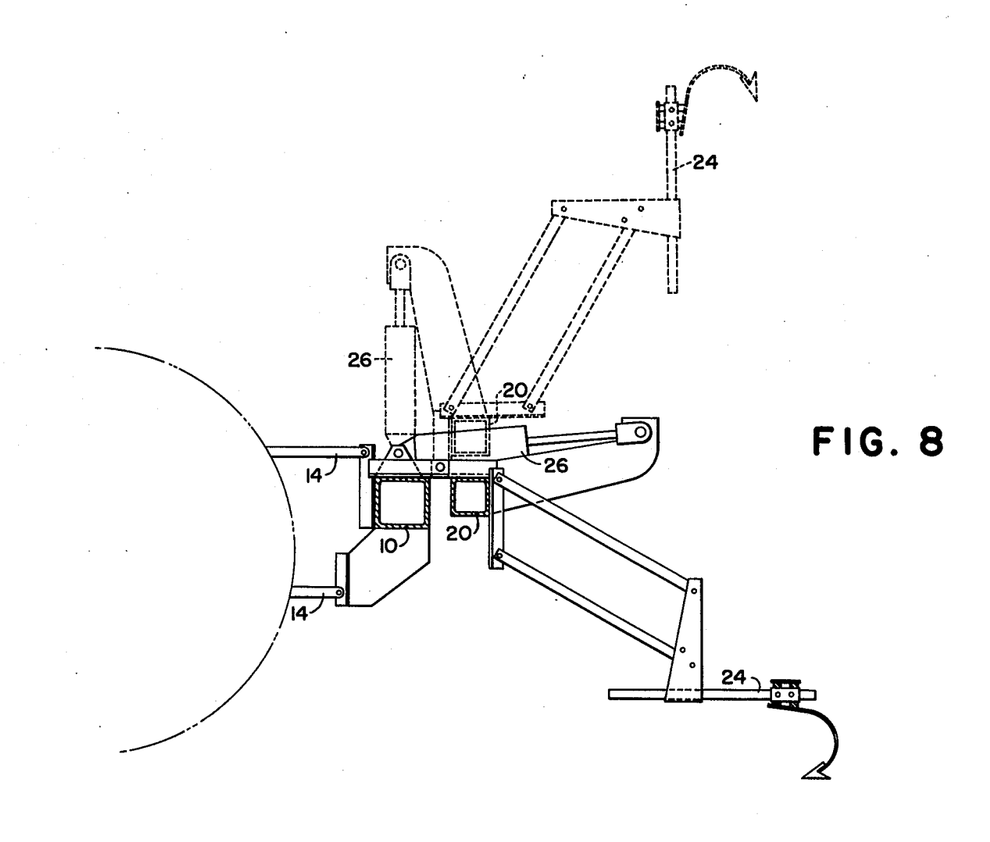
FIG. 8 is a view along lines 8—8 in FIG. 1 and illustrates in solid lines the rotating toolbar in its operational position and in dotted lines the position when in transport.

The preferred embodiment is illustrated in FIGS. 1 and 2 and includes a toolbar 20 rotatably attached to the central section 10 and movable between a rearwardly lowered operative and an upwardly elevated transport position as shown in FIG. 8. In this embodiment, the toolbar 20 extends transversely to the normal direction of travel and outwardly beyond both hinge joints between the central 10 and outboard sections 12. The actual length of toolbar 20 can be varied to accommodate whatever dimension is necessary for a particularly selected row width.

Figure 3:
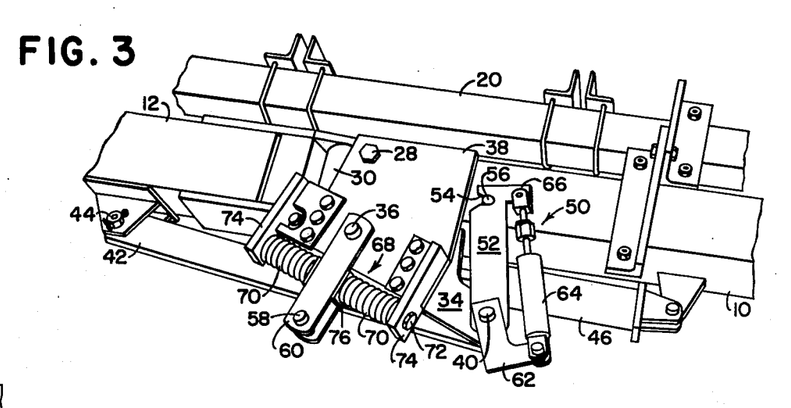
FIG. 3 is an enlarged elevational perspective of the linkage, latch and restraint mechanism at the right hinge joint between a center and outer frame and illustrating their respective positions when the implement is in the operational configuration.
Figure 4:
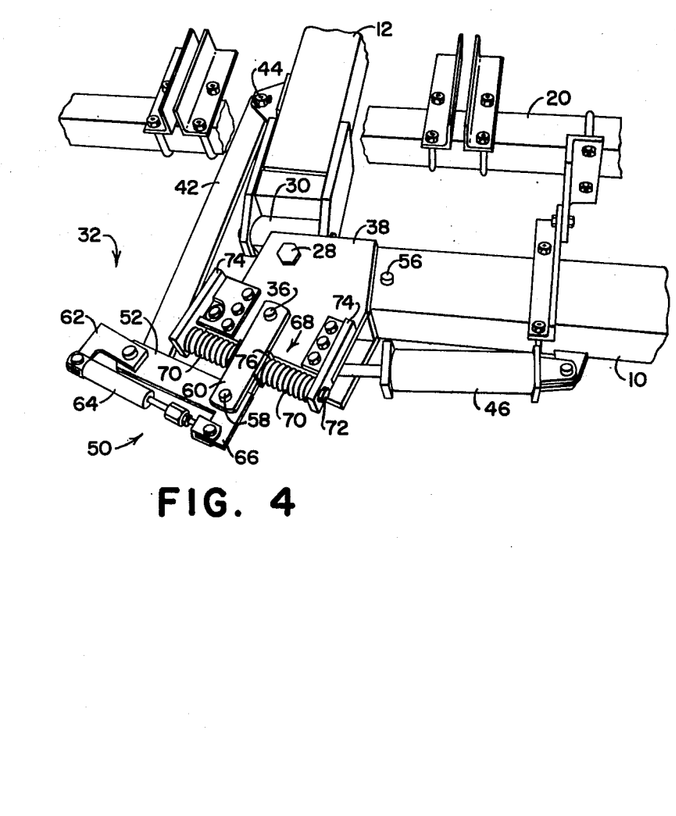
FIG. 4 is an enlarged elevational perspective similar to FIG. 3 and illustrating the linkage, latch and restraint mechanisms when the implement is in the transport configuration.
Figure 5:
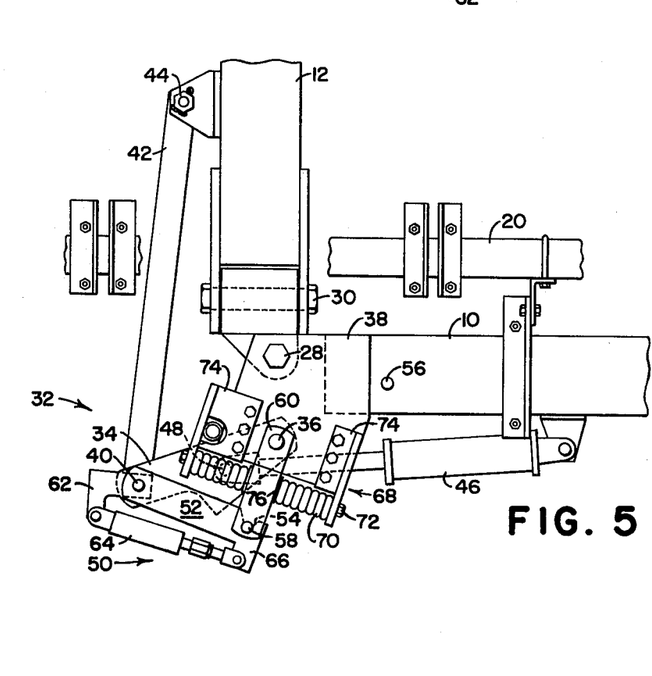
FIG. 5 is an enlarged plan view of the hinge joint illustrated in FIG. 4.

Universally connecting the outboard sections 12 with the central section 10 are vertical pivot pins 28 and horizontal pivot pins 30. These pins 28 and 30 permit the outboard sections 12 to either fold about vertical axes of flex about horizontal axes as necessary. Extending between the central section 10 and each outboard section 12 is a power linkage means 32, operative to move the respective outboard section 12 between an operative position transversely aligned with the central section 10 and a transport position extending along a fore-and-aft line. The linkage 32 is illustrated in FIGS. 3, 4 and 5 and includes a first rigid link 34 pivotally connected by a first vertical pivotal member 36 to a bracket 38 secured at the end of the central section 10. A second vertical pivotal member 40 is secured to the other end of the first link 34 and carries thereon one end of a second horizontal rigid link 42. The other end of the second link 42 is universally connected by a ball joint 44 with the front surface of the outboard section 12. An extensible and retractable hydraulic cylinder 46 has its base end pivotally connected for rotational movement about a vertical axis with the front surface of the central section 10. The ram end of the cylinder is secured by a vertical pin 48 to the central portion of the first rigid link 34. The links 34 and 42 extend horizontally and are positioned in front of the hinge joint substantially coplanarly with the axis of the outboard horizontal pivotal connection. With this coplanar positioning, the vertical movement of the linkage 32 is minimized as the outboard section 12 rides over uneven ground.

A latch means 50 is provided and is engagable with the linkage means 32 to secure the outboard section 12 in either the transverse operator's position or rearwardly extending transport position. The latch means 50 includes a power activated L-shaped latch member 52 pivotally connected by pivotal member 40 with the first link 34. The latch member 52 has at its free swinging end a slotted opening 54 compatible with both a first vertically extending latch pin 56 rigidly connected to the central section 10 and a second vertically extending latch pin 58. The pin 58 is carried on upper and lower metal straps 60 that are in turn pivotally carried by the vertical pin 36. Fixed to the second pivotal member 40 is an L-shaped arm 62 supporting a hydraulic cylinder 64 for pivotal movement thereabout. The ram end of the cylinder is pivotally connected with a projecting leg 66 of the L-shaped latch member 52. As the cylinder 64 is retracted and extended the latch member 52 pivotally rotates about the vertical axis of pin 40 and moves away from or towards a latch pin 56 or 58.

The second latch pin 58 is secured to straps or arms 60 which are movably mounted on the central section 10 by pin 36 and yieldably confined by a resilient restraint means 68. The restraint means 68 is comprised of a pair of helical springs 70 coaxially mounted on a rod 72 which is supported by mounting plates 74 carried by the central section bracket 76. Each helical spring 70 is carried by the rod 72. The springs 70 abut on their adjacent ends the strap bracket 76 and on their opposite ends respective mounting plate 73 vertical surfaces. The restraint rod 72 passes through an opening (not shown) in the strap bracket 76 permitting the straps 60 to slidably move about the vertical pivot 36. Restraining the movement of the straps 60 are the coil springs 70 as they are compressed between the bracket 76 and their respective mounting plate 74 vertical surfaces.

Figure 6:
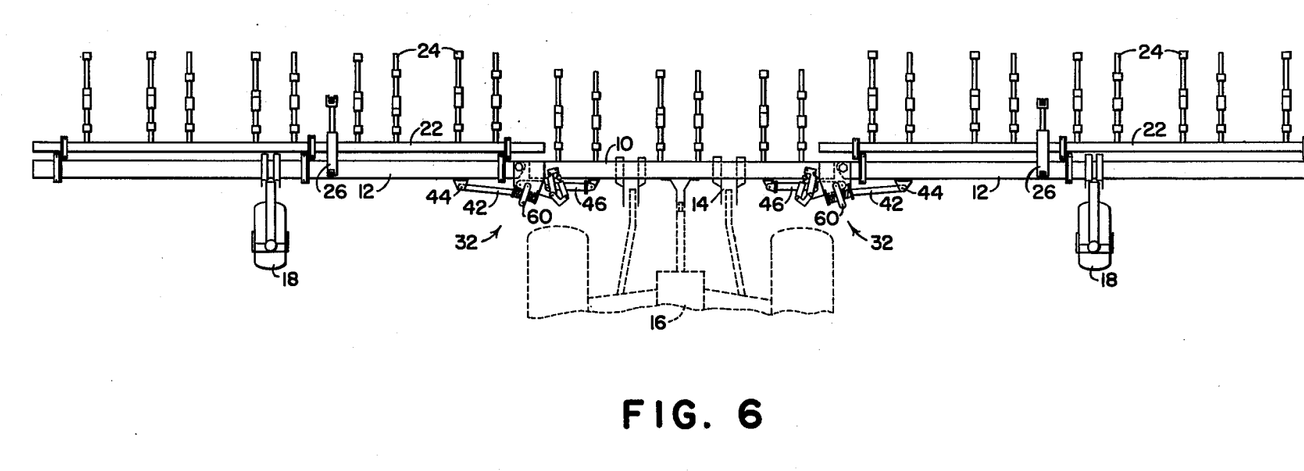
FIG. 6 is a plan view of an alternate embodiment having the rotating toolbars mounted on the outer sections.
Figure 7:
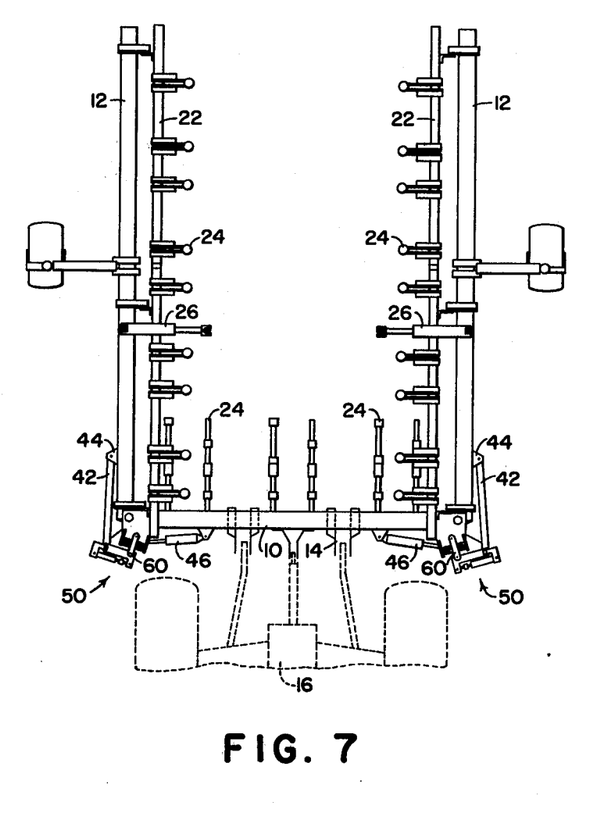
FIG. 7 is a plan view of the invention illustrated in FIG. 6 when in a folded configuration.

In the normal working operation illustrated in FIGS. 2, 3 and 6, the foldable outboard sections 12 will be transversely aligned with the central section 10 and rigidly secured against fore-and-aft movement by the latch means 50. In this position, the latch member 52 will be secured to the latch pin 56 and will secure the pin 40 and the ends of links 34 and 42 against movement. As can be seen from FIG. 3, the ends of links 34 and 42 are secured inboard of the vertical hinge pivot 28 connecting the central 10 and outboard 12 sections. Accordingly, the rearward acting forces encountered by the outboard sections 12 during operation are more easily resisted since the pin 40 and ends of links 34 and 42 would have to be moved over center or outboard of the hinge pivot 28 before the outboard sections 12 could begin to trail behind the central section 10.

During operation, the outboard sections 12 will flex about the horizontal pivot 30 as ground contour differences are encountered to minimize twisting of the links 34 and 42 and the resulting damage to the link connections, a ball joint 44 is provided between the second link 42 and outer section 12. A second ball joint could also be provided in place of pin 40 if necessary between the second link 42 and first link 34.

The implement frame can be easily and nearly automatically folded for transport. To eliminate the interference between working tools 24 mounted on section ends adjacent hinge joints, the rotating toolbar 20 or 22 is first elevated by retracting the frame mounted hydraulic cylinders 26. In this elevated position the toolbar 20 or 22 will have rotated approximately 90° from a horizontal operational position whereas a rotation of only approximately 70° would be required to eliminate tool interference.

To begin the folding operation the latch hydraulic cylinder 64 is retracted to cause the latch member 52 to swingably move about the pivot 40 and away from the latch pin 56. The linkage hydraulic cylinder 46 is then expanded as the implement is advanced across the field to aid in folding the outboard sections 12 rearwardly. Caster wheels 18 permit the outboard sections 12 to trail around behind the hinge joint and follow the central section 10. As the outboard sections 12 swing about the vertical pivotal pin 28, the linkage means 32 moves from the position illustrated in FIG. 3 to the position shown in FIG. 4. When the linkage 32 is in this latter position, the latch hydraulic cylinder 64 is extended to cause the latch member 52 to engage the second latch pin 58 and resiliently secure the linkage means 32 and their respective sections 10 and 12 in the transport configuration.

During transport the trailing outboard sections 12 frequently drift laterally. Traditionally a rigid link has been provided between the two outboard sections 12 to stabilize them during transport. To permit limited lateral drift during trailing, the present invention includes the resilient restraint means 68 which allows the trailing outboard sections 12 to move laterally approximately plus or minus 3° from a line perpendicular with the central section 10. This restraint means 68 cushions forces which are transferred to the linkage 32 from the sections 12 as each trailing section 12 drifts laterally, thereby reducing the probability of failure of the rigid linkage members 34 and 42 during transport. The restraint 68 includes the helical springs 70 which yieldably confine the pin arm 60 and thereby the second pin 58 within a range of movement. The second latch pin 58 when engaged by the latch member 52 forms a shiftable corner for the triangle comprised of the first link 34, the latch member 52 and the central section frame. This triangular configuration acts to secure the first and second links 34 and 42 in place and thereby secure the trailing outboard section 12 for transport. By providing for limited movement of the second latch pin 58, the linkage 32 and thus the trailing outboard section 12 is free to move through a limited lateral range. Because the trailing sections can shift laterally, turns are more easily maneuvered during transport and skidding of the trailing sections 12 is minimized.

The above-described invention provides the modern farmer an agricultural implement which can be utilized for either integral or drawn usage. The rotatable toolbars permit him to mount whatever groundworking tools or planters he desires at whatever row spacing he requires without encountering tool interference when the sections are folded. Transport width is limited to the width of the center section thereby enabling the operator to utilize wider outboard sections and yet safety and easily fold them rearwardly for transport. The hydraulically operated latch and linkage mechanisms provide the operator with a folding implement which can be moved between operative and transport configurations while the operator remains on his tractor thereby improving productivity and safety of operations.

I claim:

1. In a foldable agricultural implement, the combination comprised of: a mobile central section extending transversely of the direction of travel; hitch means on said central section for releasable connection to a prime mover; a transversely aligned outboard section universally mounted to each end of said central section; ground-engaging wheels supporting the outboard sections; a toolbar rearwardly spaced from and rockably mounted on the central section for movement between a lowered operative position and an elevated transport position; power means acting between the central section and toolbar for rockably moving said toolbar between its operative and transport positions; powered linkage means extending the central and each outboard section, operative to move said outboard section between a transversely aligned operative position and a fore-and-aft extending transport position; latch means engageable with said linkage means to secure the outboard section in either its operative or transport position; and resilient restraint means engageable between the latch means and central section and effective to permit limited movement of the linkage means when the outboard section is in its transport position.

2. The invention defined in claim 1 wherein the toolbar is rockably movable through an arc of approximately 90°.

3. The invention defined in claim 1 wherein each linkage means is connected by means of a ball joint with its respective outboard section.

4. The invention defined in claim 1 wherein the powered linkage means includes a first rigid link pivotally connected with the central section, a second rigid link pivotally connected at its one end with the first link and universally connected with the outboard section, and a powered extensible and retractable means between one of said links and one section and operative to fold and unfold said linkage whereby the outboard section is moved between a transverse and operative position and a rearwardly extending transport position.

5. The invention defined in claim 1 wherein the toolbar is of a greater transverse width than its respective section.

6. The invention defined in claim 1 wherein the latch means includes a first latch pin rigid with the center section, a second latch pin movably mounted on the center section and yieldably confined by the resilient restraint means, and a power activated latch member pivotally connected with said linkage means and having pin engaging means thereon engageable with said first latch pin when said outboard section is transversely aligned and engageable with said second pin when said outboard section is in an extended transport position.

7. The invention defined in claim 1 wherein the resilient restraint means includes means for yieldably confining said latch means and the outboard section in a transport position.

8. In a mobile foldable sectional agricultural implement, the combination comprised of: a mobile central section extending transversely of the direction of travel; hitch means on said central section for releasable connection to a prime mover; a transversely aligned outboard section universally mounted to each end of said central section; caster wheels supporting the outboard sections for travel over the ground; a toolbar rearwardly spaced from and rockably mounted on the outboard section adjacent the central section, movable between a lowered operative position and an elevated transport position; powered means acting between the outboard section and the toolbar for moving said toolbar between its operative and transport positions; powered linkage means extending between the central and each outboard section, operative to move said outboard section between a transversely aligned operative position and a fore-and-aft extending transport position; latch means engageable with said linkage means to secure the outboard section in either its operative or transport position; and resilient restraint means engageable between the latch means and central section and effective to permit limited movement of the linkage means when the outboard section is in its transport position.

9. The invention defined in claim 8 wherein the toolbar is rockably movable through an arc of approximately 90°.

10. The invention defined in claim 8 wherein each linkage means is connected by means of a ball joint with its respective outboard section.

11. The invention defined in claim 8 wherein the powered linkage means includes a first rigid link pivotally connected with the central section, a second rigid link pivotally connected at its one end with the first link and universally connected with the outboard section, and a powered extensible and retractable means between one of said links and one section and operative to fold and unfold said linkage whereby the outboard section is moved between a transverse and operative position and a rearwardly extending transport position.

12. The invention defined in claim 8 wherein the latch means includes a first latch pin rigid with the center section, a second latch pin movably mounted on the center section and yieldably confined by the resilient restraint means, an a power activated latch member pivotally connected with said linkage means and having pin engaging means thereon engageable with said first latch pin when said outboard section is transversely aligned and engageable with said second pin when said outboard section is in an extended transport position.

13. The invention defined in claim 8 wherein the resilient restraint means includes means for yieldably confining said latch means and the outboard section in a transport position.

14. In a mobile sectional agricultural implement, the combination comprised of: a mobile central section extending transversely of the direction of travel; hitch means on said central section for releasable connection to a prime mover; a transversly aligned outboard section universally pivotally mounted to each end of said central section; caster wheels supporting the outboard sections for travel over the ground; a toolbar rearwardly spaced from and rockably mounted on the central section for movement between a lowered operative position and an elevated transport position; power means acting between the central section and toolbar for rockably moving said toolbar between its operative and transport positions; a first rigid link pivotally connected with the central section; a second rigid link pivotally connected at its one end with the first link and universally connected with the outboard section; a powered extensible and retractable means between one of said links and one section and operative to fold and unfold the linkage whereby the outboard section is moved between a transverse and operative position and a rearwardly extending transport position; a first latch pin rigid with the central section; a second latch pin movably mounted on the central section; a power activated latch member pivotally connected with the linkage means and having pin engaging means thereon engageable with said first latch pin when the outboard section is transversely aligned and engageable with the second pin when the outboard section is in an extended transport position; and resilient restraint means engageable between the latch means and central section having means yieldably confining said latched outboard section when the latter is in a transport position.

15. In a mobile foldable sectional agricultural implement, the combination comprised of: a mobile central section extending transversely of the direction of travel; hitch means on said central section for releasable connection to a prime mover; a transversely aligned outboard section universally pivotally mounted to each end of said central section; caster wheels supporting the outboard sections for travel over the ground; a toolbar rearwardly spaced from and rockably mounted on the central section for movement between a lowered operative position and an elevated transport position; power means acting between the central section and toolbar for rockably moving said toolbar between its operative and transport position; powered linkage means extending between the central section and each outboard section including a first vertical pivotal member carried by the central section at one end portion adjacent an outboard section, a horizontal rigid link pivotally connected at its one end to the first pivotal member and rigidly connected at its other end to a second vertical pivotal member, a second horizontal rigid link pivotally connected at its one end with the second pivotal member and at its other end with the outboard section, a horizontal hydraulic cylinder pivotally connected with the first link at its one end and the central section at its other end, movable between first retracted and second extended positions to shift said outboard section between first transversely operational and a second fore-and-aft extending transport position; latch means for securing the outboard section in either its operation or transport position including a horizontal arm pivotally connected at its one end with the second pivotal member and having a slotted opening in the other end, a vertical latch pin secured to the central section, a bracket member rigid with the first link, a hydraulic cylinder, pivotally connected at its one end with the bracket member and at its other end with the slotted end of the arm, and a second vertical latch pin spaced from the first pivotal member and connected thereto by a rigid pin link pivotally secured thereto; and restraint means permitting resiliently regulated movement of the second latch pin including spring means horizontally supported by the central section within a cylindrical case and bracket means connected with the pin link, slidably carried by the case and engaged with the spring means.

16. The invention defined in claim 15 wherein the means for yieldably confining movement of the second latch pin includes spring means carried by the central section and coupled with the latch arm intermediate the second latch pin and the arm pivotal mount, said spring means yieldably urging the second latch pin towards a predetermined position.

17. In a folding implement having elongated tool-carrying central and outer beams in end to end relation, vertical hinges joining opposite ends of the central beam to respective adjacent ends of the outer beams so that the outer beams may swing between a working position in which they are transversely aligned with the central beam and a folding transport position in which they are folded rearwardly with respect to the central beam, the improvement residing in a latching device between the central and each outer beam comprising: a vertical pivot on the central beam adjacent its end; a linkage composed of a lever having a forward end forward of the beam and swingable on the pivot to permit said forward end to swing inboard and outboard with respect to the hinge axis, said linkage further including a link extending between the forward end of the lever and the outer beam; a latch element on the linkage and movable therewith; and first and second latch members mounted on the central beam engageable with the latch element when the beams are in the working and folded positions respectively, said lever and link being such length and the pivots for the links and levers being so located that said forward end of the lever is inboard and outboard respectively of the hinge axis when the beams are in their working and folded positions and said link is inclined with respect to the outer beam in both positions.

18. The invention defined in claim 17 further characterized by a power means including a hydraulic cylinder connecting said linkage to the central beam for moving the outer beams between their working and folded positions.

19. The invention defined in claim 17 further characterized by the second latch member being mounted on the central beam by a yieldable support whereby the outer frames are yieldably restricted against movement when in their folded positions.

20. The invention defined in claim 17 further characterized by rearwardly projecting tools being supported in generally equal transverse spacing on the beams, with the tools being supported on one of the beams by a toolbar parallel to the beam and vertically shiftably mounted on the respective beam so that the tools thereon may be movable to a level above the tools on the adjacent beam.

21. The invention defined in claim 20 further characterized by the toolbar having an end portion that projects transversely beyond the hinge axis between the two beams.

22. In a sectional agricultural implement having transversely aligned central and outer frame members pivotally joined at adjacent ends so as to permit the outer sections to swing rearwardly, and in which rearwardly extending tools are carried on the outer sections, the improvement residing in an elongated transverse toolbar having fore-and-aft extending arms pivotally mounted to swing vertically on the center section, said toolbar having a transverse expanse greater than the transverse expanse of the center section; rearwardly extending tools carried on the toolbar; and power means between the center section and toolbar for swinging the toolbar and the tools carried thereon to and from a level higher than the tools on said outer frame members so as to permit said outer frame members and their respective tools to swing rearwardly and inwardly to a folded position in which the tools extend transversely behind the center section below the tools carried by said center section toolbar; and latch means for holding said frame members in transverse alignment and in folded position.

23. A folding implement comprising: elongated beams extending in a transversely aligned disposition; a vertical hinge connecting the adjacent ends together to permit said beams to swing between an extended position in which the beams are transversely aligned and a rearward folded position in which one beam trails in a fore-and-aft disposition with respect to the other; elevating means on one of the beams; a toolbar offset rearwardly from the beams and carried on said elevating means, said toolbar extending transversely beyond said hinge to an overlapping end portion behind the adjacent beam; transversely spaced rearwardly extending tools mounted on the aforesaid adjacent beam to said overlapping end portion, and on the toolbar along its length; and power means on the beam with said elevating means for rocking the toolbar and the tools mounted thereon so that the latter project upwardly and at a level above the tools on the aforesaid adjacent beam to thereby permit said beams to move to and from their folded positions without creating interference between the tools.

24. The invention defined in claim 22 wherein the latch means is hydraulically powered to releasably secure the frame members in either their transversely aligned or rearwardly folded position.

25. The invention defined in claim 23 wherein the invention further includes a powered latch means between the fore-and-aft beam and its adjacent beam for releasably securing said former beam in either its fore-and-aft extending or transversely aligned position.

* * * * *

UNITED STATES PATENT OFFICE
CERTIFICATE OF CORRECTION

Patent No. 4,042,044　　　　　　　　Dated 16 August 1977

Inventor(s) Darrel Lee Honnold

It is certified that error appears in the above-identified patent and that said Letters Patent are hereby corrected as shown below:

Column 5, line 40, after "extending" insert --between--.

Column 6, line 59, delete "an" and insert --and--.

Column 7, line 5, delete "transversly" and insert --transversely--.

Column 8, line 39, after "being" insert --of--.

Signed and Sealed this

Eighteenth Day of April 1978

[SEAL]

Attest:

RUTH C. MASON
Attesting Officer

LUTRELLE F. PARKER
Acting Commissioner of Patents and Trademarks